(12) United States Patent
Stratmann et al.

(10) Patent No.: US 8,872,110 B2
(45) Date of Patent: Oct. 28, 2014

(54) THERMOGRAPHIC CAMERA

(75) Inventors: Martin Stratmann, Freiburg (DE); Karl Schuler, Titisee-Neustadt (DE); Andreas Messerschmid, Bonndorf-Gundelwangen (DE)

(73) Assignee: Testo AG, Lenzkirch (DE)

( * ) Notice: Subject to any disclaimer, the term of this patent is extended or adjusted under 35 U.S.C. 154(b) by 793 days.

(21) Appl. No.: 12/863,452

(22) PCT Filed: Dec. 22, 2008

(86) PCT No.: PCT/EP2008/011032
§ 371 (c)(1),
(2), (4) Date: Jul. 19, 2010

(87) PCT Pub. No.: WO2009/089897
PCT Pub. Date: Jul. 23, 2009

(65) Prior Publication Data
US 2010/0294933 A1  Nov. 25, 2010

(30) Foreign Application Priority Data
Jan. 19, 2008 (DE) .......... 10 2008 005 167

(51) Int. Cl.
G01J 5/00 (2006.01)
H04N 5/33 (2006.01)
H04N 5/365 (2011.01)

(52) U.S. Cl.
CPC ............... *H04N 5/33* (2013.01); *H04N 5/3651* (2013.01)
USPC ........................................................ 250/338.1

(58) Field of Classification Search
USPC ........................................................ 250/338.1
See application file for complete search history.

(56) References Cited

U.S. PATENT DOCUMENTS

| | | | |
|---|---|---|---|
| RE38,527 E * | 6/2004 | Tanaka | 250/370.08 |
| 6,762,398 B1 * | 7/2004 | Tanaka | 250/208.1 |
| 8,047,710 B2 * | 11/2011 | Ikushima | 374/121 |
| 8,274,050 B2 * | 9/2012 | Grimberg | 250/338.1 |
| 2007/0069133 A1 * | 3/2007 | DeWames et al. | 250/339.02 |
| 2007/0120058 A1 * | 5/2007 | Blackwell et al. | 250/338.1 |
| 2008/0099683 A1 * | 5/2008 | Schmidt et al. | 250/353 |
| 2010/0185406 A1 * | 7/2010 | Blanchard | 702/64 |

FOREIGN PATENT DOCUMENTS

| | | |
|---|---|---|
| WO | 0052435 | 9/2000 |
| WO | 0184118 A2 | 11/2001 |

* cited by examiner

*Primary Examiner* — Michael G Lee
*Assistant Examiner* — David Tardif
(74) *Attorney, Agent, or Firm* — Hoffmann & Baron, LLP

(57) ABSTRACT

Disclosed is an IR measuring instrument (1) comprising a least one sensor element (29) which is sensitive to infrared radiation and generates an output signal (12) that depends on the radiation incident on the at least one sensor element (29). The output signal (12) for a predefined incident radiation can be varied by means of an integration time. The actual temperature prevailing on the at least one sensor element (29) is detected and is used for varying the integration time in such a way that the integration time compensates the influence of the temperature variations on the output signal (12) of the at least one sensor element (29).

25 Claims, 1 Drawing Sheet

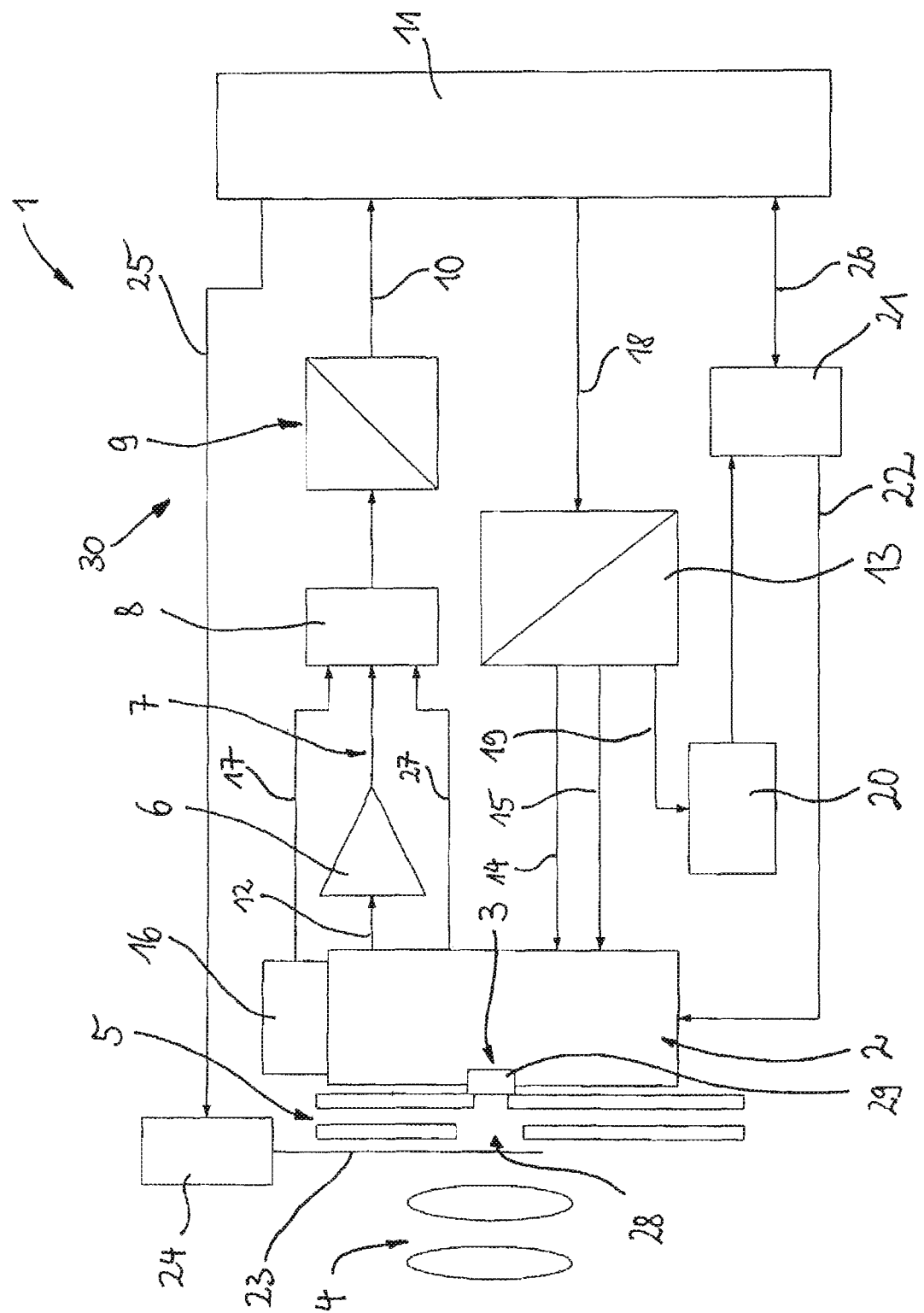

THERMOGRAPHIC CAMERA

The invention relates to an infrared (IR) measuring instrument with an IR radiation detector with at least one sensor element that is sensitive to infrared radiation, wherein the at least one sensor element is connected to an evaluation electronics, and by means of said evaluation electronics an output signal from the at least one sensor element can be detected as a function of an integration time.

The invention further relates to a method for compensation of a temperature-induced drift of an IR radiation detector of an IR measuring instrument wherein the IR radiation detector has at least one sensor element, wherein the at least one sensor element is connected to an evaluation electronics, wherein the evaluation electronics comprises an output signal from the at least one sensor element dependent on an integration time.

IR measuring instruments and methods of this kind for compensation are known and are employed as pyrometers with a bolometer or as thermographic cameras for recording of a thermographic image with a lattice-like arrangement of bolometers in the IR radiation detector.

In particular, thermographic cameras are used to determine surface temperature profiles of objects. They are often employed in environments with changing temperature. For example, the thermographic analysis of the shell of a building is carried out both from the inside and from the outside. The thermographic camera is thus moved from the warm interior into the cold external air. In this manner, the camera is exposed within a short time to a temperature change of several 10K. Temperature changes of this kind cause offset and sensitivity changes that lead to considerable deviations in measured value when left uncompensated. The reason for this is found firstly in the bolometers themselves, and secondly in the temperature dependence of the control and power supply voltages, the clock generator and the radiation from the housing, tubes and lenses of the thermographic camera.

Various methods are known for preventing or for compensating these deviations. A method and a circuit to implement such methods are described, for example, in DE 698 30 731 T1, in DE 10 2005 010 986 B4, in EP 87 01 81 B1, in EP 1 007 920 B1, in EP 1 279 011 A2, in U.S. Pat. No. 5,756,999, in U.S. Pat. No. 5,760,398, in U.S. Pat. No. 5,763,885, in U.S. Pat. No. 6,028,309, in U.S. Pat. No. 6,444,983, in U.S. Pat. No. 6,465,785, in U.S. Pat. No. 6,476,392, in U.S. Pat. No. 6,538,250, in U.S. Pat. No. 6,690,013, in U.S. Pat. No. 5,953,932, in U.S. Pat. No. 7,030,378, in U.S. Pat. No. 7,105,818, in U.S. 56,515,285 and in U.S. 56,730,909.

Shifts in zero point, for example, can be corrected by a shutter. To do so, the optical path through a surface of constant and known temperature is closed off and a reference picture is taken. There are also proposals to compensate the offset shift by subtraction of the pixel values with pixels linked thermally to the substrate. Likewise, a purely mathematic correction is known, which consists of a calculation of a correction value from a measured temperature and subtraction of this correction value from the measured pixel value.

In addition, the specific variation in the detector zero point by means of the detector voltage is a known method for zero point correction.

In addition to the zero point shift (offset), the sensitivity (gain) of the thermographic camera can be changed with the ambient temperature. In the past, different compensation and correction strategies have been proposed for this change in gain.

An additional, known variant relates to the suppression of the temperature effect at the pixel level through an active stabilization of the detector temperature, for example, with a Peltier element. In order to avoid an effect on the temperature sensitive bolometer due to fluctuations in ambient temperature, the IR radiation detectors are often equipped with a temperature stabilization, which keeps the operating temperature of the IR radiation detector at a constant, default temperature value by cooling or heating as needed. However, temperature stabilization of this kind is complicated and consumes a lot of power, which is quite undesirable in the case of simple hand-held instruments.

Furthermore, a method for subsequent mathematic correction is known. Finally, an active tracking of an additional detector voltage for sensitivity control is known.

The invention is based on the problem of creating a thermographic camera that has a simple design configuration.

To solve this problem, in an IR measuring instrument of the kind described above, the invention provides that the IR radiation detector is thermally coupled to at least one temperature sensor and that the means for influencing the integration time is formed by an output signal from the at least one temperature sensor and is configured such that a temperature-induced drift of the IR radiation detector is at least partly compensated, or is fully compensated especially within the framework of user requirements and/or the required measuring accuracy of the IR measuring instrument. It is an advantage here that the integration time can be saved as a parameter that can be easily adapted in a control circuit in order to optimize the recording quality and/or the measurement properties of the IR measuring instrument in actually prevailing operating conditions. This adaption can be controlled, for example, by software, without any design changes or complicated energy consuming electronic control circuits being needed, for example, for tracking of power supplies or a power regulator. Therefore, the design configuration of the IR measuring instrument is simple.

The temperature-induced drift can occur, for example, due to a temperature-dependent change in sensitivity of the IR radiation detector, and in particular due to the at least one sensor element. The temperature-induced drift can also be manifested due to a temperature-dependent shift in the zero point of the output signal of the at least one sensor element.

For example, the IR measuring instrument can be designed as a pyrometer or as a thermographic camera.

The invention can be used to advantage with IR measuring instruments that have a sensor element whose output signal can be affected by an integration time. For example, this integration time can involve the duration of the detection and/or evaluation of the output signal. The sensor element, for example, can be designed as a cantilever element, in which the arriving IR radiation causes a material deformation due to material heating of materials with different coefficients of thermal expansion, wherein the material deformation is detected by existing means in a resistive, capacitive, inductive, optical or other manner and can be processed into an output signal.

It is particularly favorable if the sensor element is a bolometer. In the case of a bolometer, the output signal can be affected, for example, by variation of the integration time for determination of the ohmic resistance in the bolometer.

To detect a temperature or to detect a thermographic image, it may be possible that the IR radiation detector will have a lattice-like arrangement of sensor elements that are connected to the evaluation electronics. This lattice-like arrangement is located preferably at the focal plane of a recording IR lens and/or can be integrated into a focal plane array (FPA)-component. Therefore, the sensor elements form the pixels of the FPA component and of the recorded thermal image.

For the detection of the output signal dependent on an integration time, in one embodiment of the invention it is possible that means are provided for detecting a charge quantity flowing through the sensor element within the integration time, in particular, means to determine the charge quantity collecting on a capacitor within the integration time at a specific voltage across the at least one sensor element.

For many applications, it is sufficient to use the at least one temperature sensor to detect the temperature of a portion of the housing of the IR radiation detector or the temperature of the radiation detector. Particularly good operating properties are achieved with the IR measuring instrument when the temperature is detected in the immediate vicinity of the at least one sensor element by using the at least one temperature sensor. For example, it may be possible to use the at least one temperature sensor to detect an average temperature of several or even of all sensor elements in a lattice-shaped arrangement.

According to one example embodiment of the invention, it is possible that the at least one sensor element, in particular all sensor elements in the lattice-like arrangement, is/are held at a substrate and that the temperature of the substrate is detected by the at least one temperature sensor.

Alternatively or additionally, it is possible to use a second temperature sensor with which the temperature of the housing of the IR radiation detector is measured, and that an output signal of the second temperature sensor affects the integration time in such a manner that a temperature-induced drift of the IR radiation detector is at least partly compensated.

In additional embodiments, the temperature drift of the power supply electronics of the at least one sensor element that supplies the voltages and/or currents necessary for operation and/or for read out and/or for control of the at least one sensor element, can also be detected by a temperature sensor and compensated as described.

One particularly simple possibility for variation of the integration time is obtained when the integration time is defined by an adjustable clock generator.

To read out the output signals from the at least one sensor element, it is possible for the evaluation electronics to have an analog-digital converter that provides the output signals of the at least one sensor element and/or of the at least one temperature sensor to a controller in digital format.

To affect the output signal from the at least one sensor element for compensation of a temperature drift, it is possible for the controller to have means for affecting the integration time, in particular, means for control of the clock generator.

For operation of the at least one sensor element, an electronic circuit can be provided that is set up to supply the at least one sensor element with a constant operating voltage.

The problem is solved by a method of the kind described above, in that the IR radiation detector is thermally coupled to at least one temperature sensor and in that an output signal from the temperature sensor affects the integration time such that a temperature-induced drift of the IR radiation detector is at least partly compensated.

The advantage achieved is that a constant sensitivity of the IR radiation detector can be assured across a large range of ambient temperature.

The method can be employed with IR measuring instruments with a single sensor element, for example, with pyrometers, or with IR measuring instruments with several sensor elements. For example, in one embodiment the invented method provides that the IR radiation detector has a lattice-like arrangement of sensor elements that are evaluated by the evaluation electronics. Thus, the result is a thermographic camera compensated by a method according to the invention.

To detect the output signal dependent on the integration time, it is possible to determine a charge quantity flowing across the sensor element within the integration time, in particular a charge quantity collecting on a capacitor within the integration time at a specified voltage across the sensor element.

The advantages of the invention are self-evident in many applications when the temperature of a part of the housing of the IR radiation detector or the temperature of the IR radiation detector is measured with the at least one temperature sensor. However, for a particularly effective and/or precise compensation of a temperature drift of the sensor element, it is possible to use the at least one temperature sensor to detect the temperature in the spatial vicinity of the at least one sensor element, in particular an average temperature from several or even from all sensor elements in the lattice-like arrangement of sensor elements. To do so, the at least one temperature sensor is thermally linked, that is, it has good thermal conductance, to the sensor element. To detect an average temperature, for example, it is possible to connect the involved sensor elements to a body with good thermal conductance properties and for the at least one temperature sensor to detect the temperature of this body.

To take account of temperature parameters in the environment, it is possible to use a second temperature sensor with which the temperature of a housing of the IR radiation detector is detected, and for an output signal from the second temperature sensor to affect the integration time such that a temperature-induced drift of the IR radiation detector is at least partly compensated.

The integration time for example, can be determined by a clock generator. For instance, the integration time can be determined by a particular number of cycles of the clock generator and/or by a temporal duration of a clock signal or the frequency of the clock signal at the clock generator. In this case, by means of a specific variation of the clock signals controlling the IR radiation detector, the integration time of the sensor element forming the pixels is varied as a function of the ambient temperature or the temperature of the detector, so that the environmentally induced change in the sensitivity is kept to a minimum. This will allow the recalculation of the detector signal into a radiometrically measured scene temperature, wherein only one single characteristic line is used. The dependence of the integration time on the output signal from the at least one temperature sensor can be saved as the characteristic line.

The variation in the integration time can be configured so that in addition to compensation of the temperature dependence of the sensor elements forming the pixels, compensation of the temperature dependence of the adjusting mechanism used to generate the supply and control voltages, that is, of the electronic circuit that provides the operating voltages or operating currents needed for operation of the sensor elements, is possible. Additionally or alternatively, it is possible that the temperature dependence of the clock generator can be compensated.

To evaluate the output signals from the at least one sensor element, it is possible that the evaluation electronics will have an analog-digital converter that converts the output signals from the at least one sensor element and/or from the at least one temperature sensor into a digital format and provides them to a controller.

In this case, the controller will affect the integration time, in particular, drive the clock generator.

With the invented method, the subsequent controlling of control voltages of the at least one sensor element can be eliminated. Therefore, it is possible that the at least one sensor element will be operated at a constant control voltage. This control voltage is provided in an electronic circuit designed for this purpose.

Therefore, the invention provides a novel method for correction of the environmental influences on the pixel sensitivity of at least one sensor element. This method can be implemented without temperature stabilization and nonetheless still provides a highly dynamic operation of the sensor elements.

According to the invention, it may be useful to determine a characteristic line by factory-adjustment for each IR measuring instrument upon manufacture of the IR measuring device, said characteristic line to be used subsequently for specific, currently prevailing ambient conditions, in particular for an ambient temperature, to adjust an integration time so that a constant sensitivity of the sensor element and/or of the sensor elements of the IR radiation detector is achieved. The ambient conditions thus can be defined by one or several temperatures measured at the IR measuring instrument and/or by the temperature of the IR radiation detector or of a sensor element.

It is particularly favorable when the factory adjustment is configured so that the IR measuring instrument or at least all components or modules of the IR measuring instrument that exhibit a change in sensitivity after a change in ambient temperature, are exposed to different ambient temperatures in a temperature chamber. In this case, the sensitivity of the IR measuring instrument is adjusted for each ambient temperature adjusted in the temperature chamber through selection of an integration time, so that the temperature dependence of the IR measuring instrument is largely minimized or is even eliminated.

Preferably the invention provides that the sensitivity of the IR measuring instrument is determined based on measurements of at least two radiation sources. As reference, the value indicated for a temperature sensor located in or on the IR measuring instrument is used.

Therefore, with the invention it is possible to take account of all temperature factors acting on the measured signals of the IR measuring instrument, both for the IR radiation detector, and also for the electronics connected thereon. Thus, it is possible to achieve a constant, optical sensitivity of the IR measuring instrument.

Now the invention will be explained in greater detail based on one example embodiment, but is not restricted to this one example embodiment. Additional example embodiments are indicated through combination of individual features among the claims and/or with features of the example embodiment.

The single FIGURE presents a schematic drawing of a circuit design of a thermographic camera according to the invention.

The FIGURE shows an IR measuring instrument that is designed as a thermographic camera designated overall by reference number 1.

The thermographic camera 1 has an IR radiation detector 2. The IR radiation detector 2 features an FPA 3 with a lattice-like arrangement of bolometers 29.

These bolometers 29 are sensitive to infrared radiation that moves via an IR lens 4 and an aperture system 5 to the FPA 3.

The arriving IR radiation produces output signals in the FPA 3 that are detected by a video amplifier 6 and are supplied as video signals 7 via a multiplexer 8 to an AD converter 9. The AD converter 9 converts the video signal 7 into a digital signal 10 that is supplied to a controller 11.

The controller 11 is used to control the system. Therefore, it comprises parts of the evaluation electronics 30 for evaluation of the output signals 12 of the bolometer 29 in the FPA 3. The AD converter 9 likewise forms a portion of the evaluation electronics 30.

The controller 11 drives a DA converter 13 that subsequently creates control voltages 14 and 15 to power the IR radiation detector 2. The control voltage 14 is normally used for adapting the gain, whereas the control voltage 15 is used for adapting the offset. However, in the present embodiment of the invention, the voltage 14 is held at a constant default value.

An integrated temperature sensor (not illustrated) is thermally coupled to the FPA 3 of the IR radiation detector 2 in a thermally efficient manner. The output signal 27 from this temperature sensor of the FPA 3 is sent via the entire multiplexer 8 to the AD converter 9, which sends the output signal 27 in digitized format to the controller 11.

Depending on the detected output signal 27 from the temperature sensor of the FPA 3, the controller 11 creates a control signal 18 that drives the DA converter 13 such that a defined analog voltage 19 is sent to a voltage-controlled oscillator 20 (Voltage Controlled Oscillator VCO). Due to this analog voltage 19, the VCO frequency and thus the system clock for the clock data memory 21 is adjusted so that the integration time is adjusted on the IR radiation detector 2 to be precisely long enough so that the gain sensitivity is held nearly constant across the temperature on the IR radiation detector 2 and independently of the temperature detected with the temperature sensor of the FPA 3. Thus, the integration time is defined by the application of an integration signal 22 to the IR radiation detector 2. Therefore, a temperature-induced drift of the IR radiation detector 2 due to variation of the integration time is compensated.

Due to the described interplay of the controller 11 with the voltage-controlled oscillator, means are created to affect the integration time such that a temperature-induced drift of the IR radiation detector 2 is compensated.

During the integration time, the charge quantity flowing across a bolometer 29 is determined by measuring the charge quantity collecting on a capacitor (not illustrated) within the integration time at a defined voltage across the bolometer 29. To do so, means for detection of the particular charge quantity are integrated into the IR radiation detector 2. This process is cyclically repeated for the bolometer 29 of the FPA 3 and is executed for generation of the output signal 12.

The described compensation is preferably carried out outside the intrinsic measuring times of the IR radiation detector 2, in that during the compensation, the optical path is closed by a shutter 23 in front of the FPA 3.

Alternatively, the described compensation can also be performed during the measurement times.

The shutter 23 is operated by a closing mechanism 24 that can be designed as a motor. This closing mechanism 24 is triggered via a close signal 25 from the controller 11, so that the shutter 23 is moved in front of the aperture opening 28 of the aperture system 5.

The clock data memory 21 is programmable in that default values can be exchanged with the controller 11 via the connection 26. These default values correspond to a desired integration time at a defined FPA temperature.

To take account of additional environmental factors, an additional temperature sensor 16 is arranged on one part of the housing of the IR radiation detector 2 and is coupled thereon in an effective, thermally conducting manner. The output signal 17 from this temperature sensor 16 is sent via the same multiplexer 8, which is also used for the output signal 27 of the temperature sensor of the FPA, to the AD converter 9 and is digitized there. The digitized signal 10 is sent for additional processing to the controller 11 and is used for tracking of the integration time as described for the output signal 27.

During calibration of the thermographic camera 1 before use, or in the course of its use, by means of a temperature adjustment, a characteristic line is determined that defines the relationship between the temperature prevailing at the FPA 3 or in general at the IR radiation detector 2, and the gain, that is, the sensitivity, of the bolometer in the FPA 3 for a defined scene temperature. With the sensor in operation, by means of this characteristic line and the measured temperature at temperature sensor 16 or at the temperature sensor of the FPA 3, the gain sensitivity of the IR radiation detector is always kept at a constant value independently of the ambient temperature detected with the temperature sensor 16 or with the temperature sensor of the FPA 3. This characteristic line is saved in the clock data memory 21.

In the case of the IR measuring instrument 1, at least one sensor element 29 sensitive to infrared radiation is provided, which generates an output signal 12 dependent on the radiation incident upon the at least one sensor element 29. The invention provides that the output signal 12 is variable at a default incident radiation due to an integration time, and that the momentary temperature prevailing at the at least one sensor element 29 is detected and used for this kind of variation of the integration time that then compensates the influence of temperature fluctuations on the output signal 12 or the sensitivity of the at least one sensor element 29.

The invention claimed is:

1. IR measuring instrument (1) with an IR radiation detector (2) with at least one sensor element (29) which is sensitive to infrared radiation, wherein the at least one sensor element (29) is a bolometer and is connected to an evaluation electronics (9, 11, 30), and by means of said evaluation electronics (9, 11, 30), a first output signal (12) from the at least one sensor element (29) can be detected as a function of an integration time, the first output signal (12) representing ohmic resistance of the at least one sensor element (29), characterized in that the IR radiation detector (2) is thermally coupled to at least one temperature sensor (16) and in that means (11, 20, 21) are provided for influencing the integration time in response to a second output signal (17, 27) from the at least one temperature sensor (16) to at least partly compensate a temperature-induced drift of the IR radiation detector (2) wherein the first output signal (12) is variable with respect to a particular incident radiation based on the integration time thereof, and temperature present at the sensor element (29) is detected by the at least one temperature sensor (16) and used for varying the integration time which at least partly compensates for the influence of temperature fluctuations on the sensitivity of the at least one sensor element (29).

2. IR measuring instrument according to claim 1, characterized in that the IR measuring instrument (1) is designed as a pyrometer.

3. IR measuring instrument according to claim 1, characterized in that the IR measuring instrument is designed as a thermographic camera (1).

4. IR measuring instrument according to claim 1, characterized in that the IR radiation detector (2) has a lattice-like arrangement (3) of sensor elements (29) that are connected to the evaluation electronics (9, 11, 30).

5. IR measuring instrument according to claim 1, characterized in that for detection of the first output signal (12) dependent on an integration time, means are provided for detection of a charge quantity flowing through the sensor element within an integration time.

6. IR measuring instrument according to claim 5, characterized in that the means for detection of a charge quantity flowing through the sensor element within an integration time includes means for determining the charge quantity collecting on a capacitor within the integration time at a specified voltage (14, 15) over the at least one sensor element (29).

7. IR measuring instrument according to claim 1, characterized in that the at least one sensor element (29) is held on a substrate and in that the temperature of the substrate can be detected by the at least one temperature sensor.

8. IR measuring instrument according to claim 1, characterized in that a second temperature sensor (16) is provided so that the temperature of a housing of the IR radiation detector (2) can be detected, and that means (11, 20, 21) are provided to affect the integration time due to a third output signal (17) of the second temperature sensor (16) and are set up so that a temperature-induced drift of the IR radiation detector (2) is at least partly compensated.

9. IR measuring instrument according to claim 1, characterized in that the integration time is determined by a clock generator (20).

10. IR measuring instrument according to claim 1, characterized in that the evaluation electronics (9, 11, 30) has an analog-digital converter (9) that provides the first output signal (12) of the at least one sensor element (29) and/or the second output signal (17, 27) of the at least one temperature sensor (16) to a controller (11) in digital format.

11. IR measuring instrument according to claim 10, characterized in that the controller (11) has means for affecting the integration time.

12. IR measuring instrument according to claim 11, characterized in that the controller (11) includes means (13, 21) to drive (18, 26) a clock generator (20, 31).

13. IR measuring instrument according to claim 1, characterized in that an electronic circuit (13) is provided that is set up to control the at least one sensor element (29) with a constant control voltage (14).

14. Method for compensation of a temperature-induced drift of an IR radiation detector (2) of an IR measuring instrument (1) wherein the IR radiation detector (2) has at least one sensor element (29), wherein the at least one sensor element (29) is a bolometer and is connected to an evaluation electronics (9, 11, 30), wherein the evaluation electronics (9, 11, 30) detects a first output signal (12) from the at least one sensor element (29) dependent on an integration time, the first output signal (12) representing ohmic resistance of the at least one sensor (29), characterized in that the IR radiation detector (2) is thermally coupled to at least one temperature sensor (16) and in that a second output signal (17, 27) from the temperature sensor (16) affects the integration time such that a temperature-induced drift of the IR radiation detector (2) is at least partly compensated, wherein the first output signal (12) is variable with respect to a particular incident radiation based on the integration time thereof, and temperature present at the sensor element (29) is detected by the at least one temperature sensor (16) and used for varying the integration time which at least partly compensates for the influence of temperature fluctuations on the sensitivity of the at least one sensor element (29).

15. Method according to claim 14, characterized in that the IR radiation detector (2) has a lattice-like arrangement (3) of sensor elements (29) that are evaluated by the evaluation electronics (9, 11, 30).

16. Method according to claim 14, characterized in that for detection of the first output signal (12) depending on the integration time, a charge quantity flowing through the sensor element within the integration time is determined over the sensor element.

17. Method according to claim 16, characterized in that the charge quantity collecting on a capacitor within the integration time at a specified voltage (14, 15) is determined.

18. Method according to claim 14, characterized in that the temperature of the at least one sensor element (29) is detected by the at least one temperature sensor.

19. Method according to claim 18, characterized in that an average temperature of at least a plurality of the sensor elements (29) is detected by the at least one temperature sensor.

20. Method according to claim 14, characterized in that a second temperature sensor (16) is used with which the temperature of a housing of the IR radiation detector (2) is detected, and in that a third output signal (17) of the second temperature sensor (16) affects the integration time in such a manner that a temperature-induced drift of the IR radiation detector is compensated at least in part.

21. Method according to claim 14, characterized in that the integration time is determined by a clock generator (20, 21).

22. Method according to claim 14, characterized in that the evaluation electronics (9, 11, 30) has an analog-digital converter (9) that converts the first output signal (12) of the at least one sensor element (29) and/or the second output signal (17, 27) of the at least one temperature sensor (16) into digital format and provides them to a controller (11).

23. Method according to claim 14, characterized in that the controller (11) affects the integration time.

24. Method according to claim 23, characterized in that the controller (11) affects a clock generator (20, 21).

25. Method according to claim 14, characterized in that the at least one sensor element (29) is operated at a constant control voltage (14).

* * * * *